UNITED STATES PATENT OFFICE.

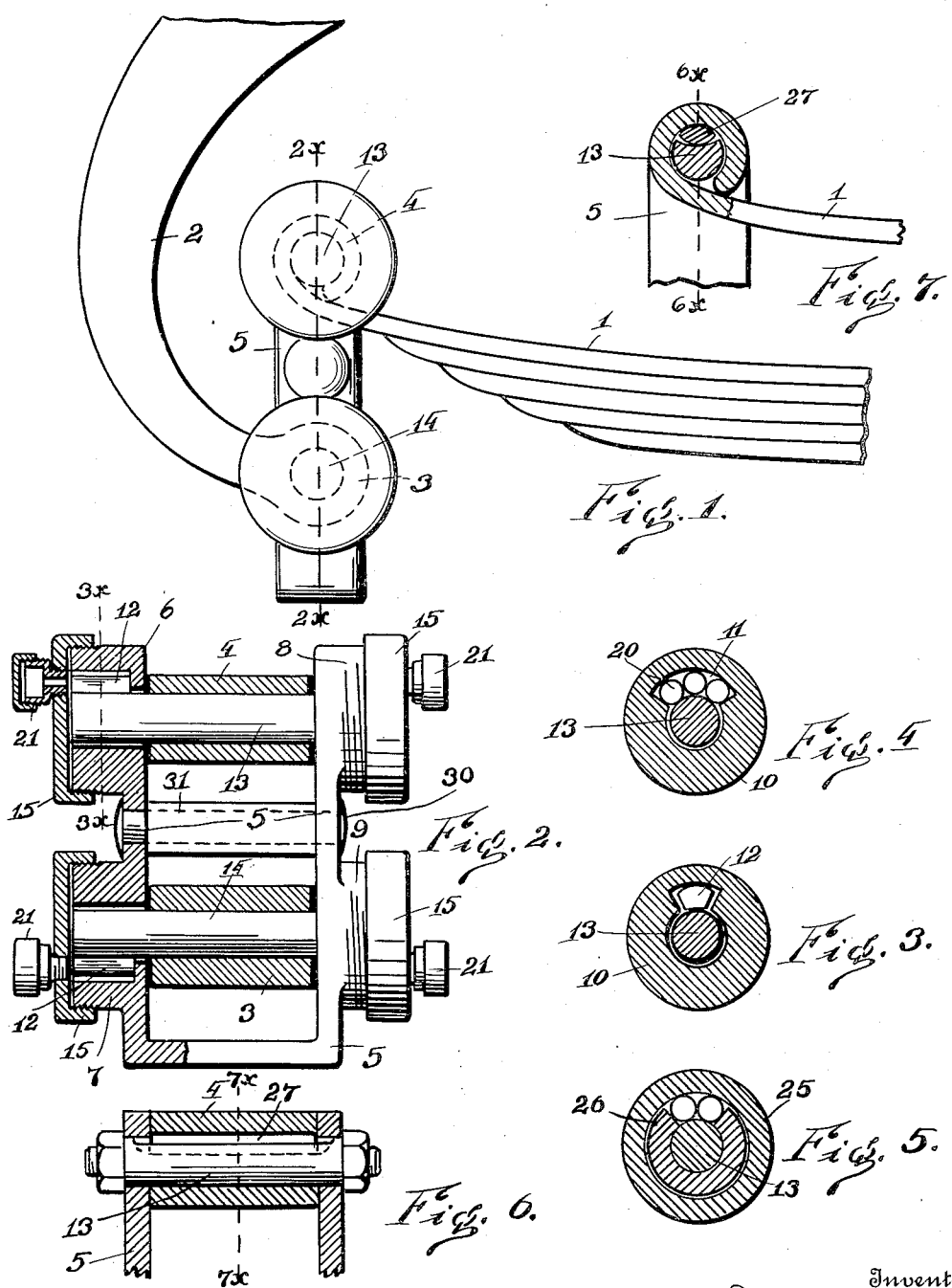

CHARLES J. PEMBROKE, OF ROCHESTER, NEW YORK.

ANTIFRICTION DEVICE.

1,236,756.  Specification of Letters Patent.  Patented Aug. 14, 1917.

Application filed February 24, 1916. Serial No. 80,288.

*To all whom it may concern:*

Be it known that I, CHARLES J. PEMBROKE, a citizen of the United States, residing at Rochester, in the county of Monroe and State of New York, have invented certain new and useful Improvements in Antifriction Devices, of which the following is a specification.

The object of this invention is to provide a means for eliminating the noise or squeaks caused by the friction of the shackle bolt rubbing on its bearing surface.

This and other objects of the invention will be fully illustrated in the drawings, described in the specification and pointed out in the claims at the end thereof.

In the drawings,

Figure 1 is a side elevation of the end of the spring and the bracket attached to the body of the vehicle with the shackle interposed therebetween.

Fig. 2 is a front elevation of the shackle partly shown in section, the section being taken on the line $2^x-2^x$ of Fig. 1.

Fig. 3 is a section on the line $3^x-3^x$ of Fig. 2.

Fig. 4 is a sectional view showing a modification of the anti-friction device shown in Fig. 3.

Fig. 5 is a sectional view showing a further modification in which both a complete and a mutilated bushing are used to hold the rollers against the bolt.

Fig. 6 is a longitudinal sectional view taken on the line $6^x-6^x$ of Fig. 7 showing the rocker interposed between the bolt and the eye of the spring, etc.

Fig. 7 is a sectional view taken on the line $7^x-7^x$ of Fig. 6.

In the drawings like reference numerals indicate like parts.

In vehicles having spring supported bodies, shackle bolts are used for the purpose of connecting the bodies to the ends of the springs. These springs are usually formed with an eye in the end of them to receive the bolt. These springs yield as the vehicle moves. As the springs yield these bolts rub or teeter in the ends of the springs or in the brackets connected to the body. This rubbing causes a squeaking noise. It is impossible to keep this bolt lubricated so that the squeaking noise will be eliminated because the entire weight of the body is carried by these bolts and a tremendous pressure is exerted on them where they contact with their bearings. Any lubricant that is interposed between the bolt and the bearing is quickly pushed out to the one side or the other and even though an ample quantity of lubricating material is placed on either side of the bolt in the bearing, no lubricant will be carried back between the bolt and the bearings. The bolts do not rock far enough to be self lubricating. Consequently these shackle bolts become dry on their rubbing surfaces in a very short time and the cost of keeping them lubricated is prohibitive.

To avoid this I provide a shackle for suspending the vehicle on its shackle bolts that will not squeak even though it is not lubricated. This shackle is also constructed so as to cause the lubricant that is placed therein to enter the part of the bearing that is supporting the load, this being accomplished by the use in the bearing of a rocker or rollers as the case may be surrounded by grease so that under the slight teetering or oscillating which will take place during the bending of the spring, the lubricant will be distributed to all the points of contact created by the different positions of the shackle bolts during the bending of the springs. For this purpose a pocket-like compartment is provided in the shackle in which is provided a clearance between the rocker or rollers to receive the lubricant, the clearance of the bearing being so arranged, however, that it will not rattle, because rattling between the bolt and the shackle would be just as detrimental as would be squeaking.

The details of this invention will now be more fully described as follows:

In the drawings reference numeral 1 indicates the spring of a vehicle and 2 the bracket attached to the body thereof. The bracket is provided with an eye 3 and the spring is provided with an eye 4. Connecting the spring and the bracket is a shackle 5 which is preferably U shaped and has the bearing cups 6, 7, 8 and 9 therein. In each of these bearing cups there is provided a segmental recess as shown at 11 in which are placed the rocker 12 or the rollers 20. The rocker is shaped in cross section substantially like the segment of a circle, the upper portion of it being convexly curved with converging sides below. The curve of the top of the rocker is generated by a radius that is somewhat shorter than the radius which generates the segmental bearing surface in the cup shown at 11 and the bottom of the rocker is slightly concaved so as to make good rocking contact with the shackle bolt.

Shackle bolts 13 and 14 are engaged with the rocker in the bearings. The ends of the bearing cups are closed by the caps 15 which are preferably threaded to the bearing cups and provided with grease cups as shown at 21.

The shackle bolt 13 is intended to engage with the eye on the spring 1 and the shackle bolt 14 is intended to engage with the eye on the bracket 2. Each of these shackle bolts is intended to make a drive fit with the eye with which it engages or may be otherwise held against rotation. The shackle bolts are held in place and against end movement by means of the shoulder of the bracket and spring eye coming in contact with the shackle 5.

The segmental recesses 11 in the cups 7 and 9 must be inverted from the position which the segmental recesses 11 will occupy in the cups 6 and 8; that is, the recesses must be placed in the cups 6 and 8 with the rockers at the top and in the cups 7 and 9 with the rockers at the bottom, as shown in Fig. 2.

The gravity thrust of the vehicle body is downwardly on the bracket 2 and this in turn is transmitted to the pin 14, the downward thrust of which is communicated to the rocker supported by the cups 7 and 9. The downward thrust is thereby communicated to the shackle 5 and through the shackle to the bearing surfaces and the rocker in the cups 6 and 8 which in turn communicate it to the shackle bolt 13 which is supported by the spring 1.

In the flexing of the spring 1 and the swaying of the car body, the shackle bolts 13 and 14 will teeter through a small angle and by reason of the rocking contact between the shackle bolts and the rockers 12, will have a minimum amount of friction and the bearing will be correspondingly both flexible and noiseless.

In Fig. 4 I have shown a modification of this bearing in which 20 indicates rollers that are interposed between the shackle bolt 13 and the bearing surface 11.

The rollers 20, shown in Fig. 4, would be placed above the bolt 13 and below the bolt 14 just as the rockers 20 would be placed, as above described.

In Fig. 5 I have shown a bearing plate made up of a whole bushing 25 and a segmental bushing 26 used with two rollers in connection with the bolt 13. In this case the bushings 25 and 26 would be used as a substitute for the bearing plate 10.

In Figs. 6 and 7 I have shown a rocker 27 elliptical in section interposed between the bolt 13 and the eye 4 of the spring 1, it being understood that a similar bolt and rocker will be provided in the eye of the bracket attached to the vehicle. In vehicles having semi-elliptical springs, bearings, similar to the foregoing, would be used. In such vehicles they would be used where the front springs are attached to the vehicle at their forward end and to the free end of the shackle at the rear end of the front springs and in the connection at the rigid end of the shackle supporting the rear of the front spring. They would be used in connection with the rear springs in the same way except that in certain instances they would be reversed, and in other instances both ends of the rear springs would be shackled and where platform springs are used these bearings would be used where the plain pin bearing is now used.

A rivet 30 and a sleeve 31 are shown in Fig. 2 by which the sides of the shackle are held suitably spaced apart.

I claim:

1. A noiseless spring connection for vehicles comprising a spring end, a supporting member carried thereby, a bearing for said member, a rocking member between the bearing member and the supporting member, the periphery of said rocking member being eccentric to the periphery of said supporting member and said bearing member.

2. A noise reducing device for connecting the springs to a vehicle consisting of a bracket having a bearing formed thereon, an axle for said bearing, an eccentric rocking member between said bearing and the periphery of said axle and means for attaching all of the said devices to the spring.

3. In a spring connection the combination of a bolt, a moving member surrounding said bolt, a seat on the periphery of said bolt, a rocking member resting on said seat and interposed between said bolt and said moving member.

4. A noise reducing spring connection comprising a spindle and a circular bushing, a segmental bushing placed in the circular bushing between it and the spindle with its ends located at the top with an open space between the ends, rockers carried in said open space between said spindle and said circular bushing.

5. A noise reducing device for vehicle spring eyes consisting of a shackle bolt, an eccentric rocking member mounted to rock over the periphery of said shackle bolt and a bearing for said rocking member.

6. A noise reducing device for vehicle spring eyes consisting of a shackle bolt, an eccentric rocking member mounted to rock over the periphery of said shackle bolt, and a bearing for said rocking member, said rocking member being interposed between said shackle bolt and the bearing.

7. In a noise reducing bearing for shackle bolts, a supporting member, a movable bearing member and an eccentric rocking device interposed between the outer periphery of said supporting member and the inner periphery of said movable member, one of said members having a rocking movement relative to the other.

8. A shackle comprising two parallel plates, each having two bearing cups thereon, bolts supported between said plates in said cups, noiseless rocking bearings provided between said bolts and said cups.

9. A shackle comprising two parallel plates, each having two bearing cups thereon, bolts supported between said plates in said cups, noiseless rocking bearings provided between said bolts and said cups, means for holding said plates together suitably spaced apart.

10. In a spring shackle assembly, the combination of two side members, means for holding them apart at a desired distance, bosses on each of said side members, a bearing recess in each of said bosses, a vehicle spring held between the side members, a bearing member for the said spring and a rocking member between said spring bearing member and said bearing recess.

In testimony whereof I affix my signature.

CHARLES J. PEMBROKE.